Figure 2:
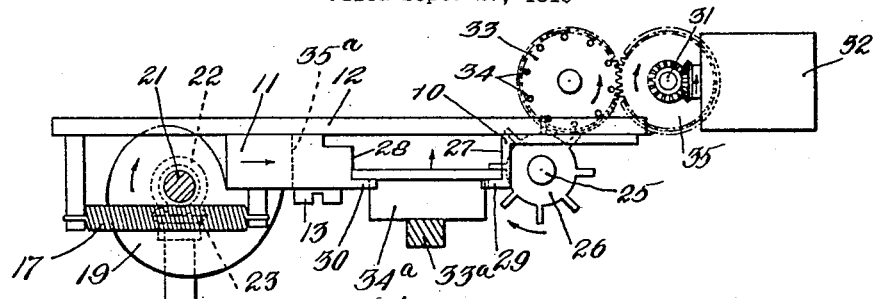

Aug. 31, 1926.

G. F. ROOKE 1,598,153

VARIABLE VALUE REGISTER

Filed Sept. 27, 1919

Inventor:
George F. Rooke
by Wright, Brown, Quimby & May
Attys.

Patented Aug. 31, 1926.

1,598,153

UNITED STATES PATENT OFFICE.

GEORGE F. ROOKE, OF PROVIDENCE, RHODE ISLAND.

VARIABLE-VALUE REGISTER.

Application filed September 27, 1919. Serial No. 326,920.

The present invention relates to a method or means for registering values, and particularly such money values, as fares and prices, which may vary with lapse of time or with distances travelled, as in the case of transportation of passengers by a common carrier. The principle of the invention may have many specific applications, wherefore the protection which I desire to obtain from the invention is not limited to the particular applications hereinafter mentioned for the purpose of illustration and explanation, except as appears from the appended claims. However, in order to illustrate what I mean by the variable values which the present invention causes to be registered, I may mention such instances as moving picture exhibitions or vaudeville performances, and street railway transportation. Patrons of entertainments, such as these suggested, may desire to remain in the theatre for a longer or shorter period of time, and passengers on street cars may need to travel for a longer or shorter distance. In either of these cases, as well as in others in which the value of the commodity of benefit purchased is dependent on the factor of time, distance or other variable factor, equity requires that the price, which the purchaser is required to pay, should be governed by the variable factor. This principle is recognized in the case of street car transportation by the establishment of zone systems, but the putting of the principle into practice in this and other instances, has been hindered by difficulties of measuring the values received by individual patrons, and particularly of registering or recording fully and correctly such values, and the payments therefor by purchasers or patrons.

To refer again to the instance of the street car transportation system, the adoption of the logical system of zones as a means for determining the amounts due as fares, has been largely prevented on account of the difficulty of identifying individual passengers with the distances travelled by them, and the difficulty of compelling conductors or guards to register correctly the amounts paid by passengers. Heretofore reliance has been placed altogether on the accuracy and volition of the guard or conductor of the vehicle for collecting the proper number of fares from each person according to the distance travelled and making a full and accurate record thereof, since such devices as automatic fare registers, the requirement of payment before entering the vehicle, and so forth, are not in themselves sufficient to compel the passenger to keep true and full account of the fares due.

In recording fare collections under a zone system a number of variables must be taken into account, for the passenger who travels across more than one zone boundary must pay a multiple of the fare unit according to the number of zones traversed, while any passenger who travels only from one zone to the next must pay the same fare wherever the zones may be in which he has mounted upon and alighted from the vehicle. To illustrate these difficulties more clearly, let it be assumed that a rapid transit company is operating a street car line in a system containing eight zones. A passenger may board the car in any of the zones and travel into any other zone up to the last one, and each passenger no matter when he gets on the car or where he alights, must be required to pay the exact number of units of the fare corresponding to the number of zones in which he has travelled.

Figure 1:
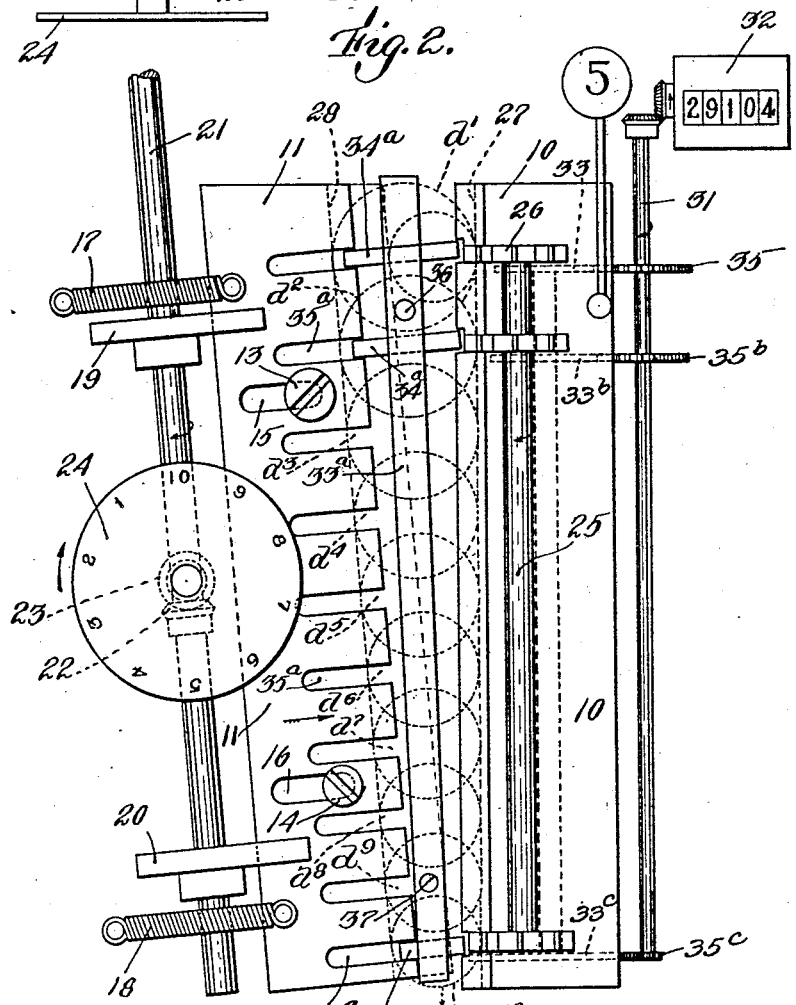

My object has been to furnish a registering device by which to increase the difficulty of evasion of payment of fares by passengers and to compel the co-operation of the passengers in recording fares, and so prevent failure of the conductor to make a record required by the operating company. I have accomplished this object by the use of a recording apparatus having the principles which are explained in the following specification, and in connection with a drawing illustrating one possible form of the main parts thereof, and particularly pointed out in the claims. Mechanism embodying these principles may be constructed in various forms and applied in diverse ways, and the illustration given in these drawings is merely one possible embodiment of means. In these drawings, Figure 1 is an elevation of a form of apparatus or means containing the principles of the invention particularly claimed herein. Figure 2 is a plan view of the same.

Like reference characters designate the same parts in both figures.

I would remark at the outset that the purpose of these drawings is to illustrate an explanation of the principles of the invention in such full, clear, and exact terms that persons skilled in the art of recording and registering machines may apply such principles in commercially practical constructions, and that I do not attempt in these drawings to illustrate all the mechanisms and various connections which may be necessary for the smooth and invariably correct functioning of a commercial machine, as I have conceived that such mechanisms and adjuncts are not necessary to be shown in order to explain the principles of the invention, and that suitable embodiments thereof may be supplied from the existing information available to the skilled worker in this art. It may be said, then, that the drawing is rather a diagrammatic representation of the essential parts of an apparatus embodying the present invention in their co-operative relation to one another. At the same time it should be noted that I do not restrict the protection which I claim for this invention to the exact parts and constructions here shown.

Referring now to the drawings, 10 and 11 represent the opposite sides or bounding wall members of a receptacle for certain bodies which may be placed into such receptacle. As here shown the receptacle has the form of a chute with converging sides. This condition may be described in a general way as being, that parts of its bounding sides or walls at different distances from its entrance are at different distances apart, the parts of the receptacle having the narrower widths being in all cases farther from the entrance than those parts having relatively greater width. In consequence bodies of different widths when placed in the receptacle and allowed or caused to traverse the same will move through the receptacle until they reach parts of the receptacle of which the widths are respectively no greater than the widths of the bodies thus entered, whereupon such bodies will be arrested. Bodies of relatively less width will travel farther into the receptacle before being so arrested than will bodies of relatively greater widths.

The bodies above referred to may be of any shape, dimensions, or configuration, and they may be of any material, provided only they have sufficient stiffness to co-operate with other parts of the device in substantially the manner presently described. The embodiment of such bodies here illustrated is in the form of circular disks of different diameters, but I have in contemplation bodies of other shapes. The important fact, however, is that the bodies comprise a series consisting of as many units as there are zones in the transportation system, and that each unit of the series differs from every other unit in one of its dimensions, this distinguishing dimension being considered for the purpose of the present description, the width of the body. In the further explanation I will assume for the purpose of convenience of description, but without limiting intent, that the bodies are circular disks and that the receptacle is a chute with tapering sides arranged in a position which is near enough to the upright to allow such disks to pass by gravity from the entrance, which is the larger end, toward the smaller end of the chute.

One of the sides of the chute, as 11, is adjustable toward and away from the other side, so as to increase or diminish the width of the chute, but without altering the angle included between its opposite side walls. Therefore the member 11, is mounted upon a back wall 12 by headed studs 13 and 14, which pass through slots 15 and 16, respectively, which are perpendicular to the chute-bounding edge of this member. Springs 17 and 18 are connected to the wall member and to fixed anchorages and are under stress tending constantly to withdraw this member from the opposite side member. This withdrawing movement is limited, and the wall member is further adjusted as to its position by two cams 19 and 20, the outline of which is shown in Figure 2, and of which the cam edge or outline bears against the outer side of the wall member. These cams are mounted on a shaft 21 equipped with a bevel gear 22 and with a complemental gear 23 on a control shaft, by the rotation of which the cams may be turned and the chute wall thereby advanced or retracted. 24 represents a dial which is mounted on said control shaft and is marked with numbers corresponding to the number of zones of the system, which dial with reference to a suitable index, not shown, will indicate the settings of the cams 19 and 20, and thereby of the chute wall 11, according to the zone in which the car may be at any time. The dial may be rotated manually by the conductor or motorman of the car, and exemplifies means for turning the control shaft to set the wall 11.

Beside the wall 10 of the chute is mounted a shaft 25 on which there are secured a number of toothed disks or star wheels 26 spaced apart and equal in number to the number of zones of the system. These several disks are arranged beside parts of the chute of different widths, and they are so mounted that a disk lodged in the chute beside any one of them will overlap one of the arms or teeth of the wheel. Although only three such disks are shown, it is obvious that to illustrate the full complement of them requires only the placement of duplicate disks beside the locations indicated by the dotted line circles $d^3$, $d^4$, etc.

With reference to Figure 2 it will be noted that the surfaces there designated 27 and 28 of the members 10 and 11 bound the chute and engage the opposite edges of the inserted disk, and the lips or flanges 29 and 30 engage the front side of any such disk to hold it upright in the chute. Openings through the wall 27 are provided beside the locations of the several star wheels, and the arms of such wheels pass through such openings and in each position of rest of any wheel one of the arms is back of the adjacent part of a disk lodged in the chute.

In the apparatus chosen for illustration, which is adapted for use with a transportation system having ten zones, the series of disks used in connection with it comprises ten disks of graduated sizes, the receptacle is designed to cause each of these different disks to be arrested in a given location when the receptacle or chute is extended to its greatest width, and the different star wheels are placed beside these several locations. Said locations are indicated in Figure 1 by the circles marked $d^1$, $d^2$, $d^3$, $d^4$, $d^5$, $d^6$, $d^7$, $d^8$, $d^9$, $d^{10}$, respectively. Said circles designate illustratively the relative widths of the individual disks of the entire series. Thus a disk of any size dropped into the receptacle will fall through it until arrested by its engagement with the opposite walls of the receptacle, and it will occupy approximately one or another of these designated locations according to the size of the disk and the distance apart to which the walls are adjusted according to the principles and by the means previously described. The adjusting cams 19 and 20 are designed, and the gearing between the same and the indicating dial 20 so proportioned, that when the adjustment is set to indicate zone 10 on the dial, the disk of smallest width will pass to the position $d^{10}$ before being arrested, while when the dial indicates adjustment for any other zone as 1, 2, 7, or 8, for instance, the receptacle will be appropriately narrowed to arrest the same disk in the location $d^1$, $d^2$, $d^7$, or $d^8$, respectively; while disks of other widths will be correspondingly arrested in different locations above or back from their respective positions indicated in the drawing. Thus, for example, if the setting is made for zone 7, the smallest disk, if dropped into the chute would be arrested at the position $d^7$, the next larger disk in the position $d^6$, and the successively larger disks in the positions $d^5$, $d^4$, $d^3$, $d^2$, and $d^1$; and the entrance of the chute would be contracted too much to admit any disks of the three largest sizes. Or when the adjustment is for zone 1, then only the smallest disk can enter the chute, and it would be arrested in approximately the position $d^1$ besides the first star wheel. It is intended that in each of the prescribed adjustments or setting, any of the disks will be arrested by the walls of the chute in operative position with respect to one of the star wheels.

The several star wheels are geared to rotate a shaft 31, which drives a counter or register 32, such gearing conveniently consisting of a disk 33 having pins 34 located adjacent to each star wheel in position for the arms of the latter to engage the pins whenever the star wheel is turned. The arrangement of the uppermost star wheel and the pin carrying-wheel is shown in Figure 2. The disk or wheel 33 may be itself a gear wheel, or it may be connected to a gear wheel, which is in mesh with a complemental gear 35 on the shaft 31. Each of the star wheels is similarly geared to the shaft 31, but by trains $33^b$—$35^b$, $33^c$—$35^c$, and so forth having respectively different values, with the object and result that equal steps of movement of the different star wheels will cause differing values to be registered. Thus assuming as before that the machine is organized for a ten zone system and that an additional fare unit is required of passengers traveling from each zone to the next, then the star wheel beside the location $d^1$, when thus moved will cause registration of one unit, that in the location $d^2$, will cause registration of two units, and so on by successive unit increments until the last star wheel causes registration of ten units.

The apparatus when organized for commercial use is enclosed in a casing having a slot or other suitable guiding means, constructed and arranged according to principles well known and understood by those skilled in this art, for causing the disks to drop always behind the proper tooth of the star wheel beside which the disk lodges, so that proper registration may be possible.

For thus causing registration through the medium of the inserted disks, I provide a bar $33^a$ which runs lengthwise of the chute at one side of the path in which the disks travel. Cross pieces $34^a$ are carried by this bar adjacent to the several stopping locations of the disks and are adapted to be passed through notches $35^a$ in the edges of the side members 10 and 11 and so to be pressed against any disk which may have lodged beside any of the cross bars, with the effect of displacing such disk. Said bar $33^a$ is mounted with ability for thus moving from front to rear of the chute and it is so moved by suitable means operated either directly, or indirectly through intermediate mechanism, by the conductor or by automatic means. An operative mode of thus mounting and moving the bar is to provide two or more separated guide rods 36 and 37 upon it; said rods being contained in a sliding manner in guideways provided on the casing and protruding therefrom accessibly to the conductor or other attendant. Hence when the bar is moved backward, any disk which may have lodged back of any cross piece is pushed back out of the chute, and in being so displaced it operates the adjacent star wheel by turning it, and so causes registration of a value proportional to the position of the disk in the chute. It is not necessary that the disk should directly move the star wheel through an entire step necessary to operate the register, but it is enough if the disk merely initiates such movement, which is completed by other means, of which various types suitable for the purpose are already known in the art of recording machines, and one of which is a spring pawl having inclined sides to enter between the teeth of the star wheel and exert a propelling force as well as a holding action; illustrated in the patent to J. J. Farrell, No. 1,095,832 dated May 5, 1914. Upon being thus so displaced, the disk passes to any convenient depository, the nature and location of which are not at all material to the present invention.

The manner of use of the invention to cause registration of the proper number of fares to be paid by each passenger may now be understood. The passenger upon mounting the car is handed a disk, or counter, by the conductor, and this counter is one of the series previously described. If the passenger boards the car in the first zone, the disk handed him is the first or smallest one of the series; if in the second zone, it is the next larger size; if the fifth zone, the fifth size disk; and if the last zone, the largest sized disk. Meanwhile as the car travels from zone to zone, the width of the chute is progressively adjusted from the narrowest width, wherein the smallest size disk will lodge in approximately the position $d'$, to successively wider limits as already fully described. When the passenger is about to alight he drops the disk, which was previously handed him, into the chute, and thereupon the bar 33ª is moved to displace the disk and cause registration of the sum required of him to pay for his transportation. If he entered the car in the first zone and alighted in the first zone, the disk handed him will be one of the smallest size and will stop in the first position in the chute, calling for the payment of one fare. If he had remained on the car until the eighth zone, for instance, is reached, his disk will drop to the eighth position and show that he must pay eight fares; while if he had entered in the sixth zone, for instance, he would have been given a disk of the sixth size, which being dropped in the chute when the car is in the eighth zone would drop into the second position and indicate that payment of two fares is due.

The foregoing description of a particular means and mode of operation is given for explanation of the principles of the invention without intent to indicate any other limitations of the scope of the invention and the protection which I claim therefor than are indicated by the appended claims. Numerous modifications in and departures from the constructions and arrangement here shown and described may be made within the principles of the invention and the scope of my protection. I conceive that the fundamentals of any embodiment of the invention include a series of bodies of which the individuals differ from one another in at least one dimension, which have been called the "width" in this description, although they may vary in other dimensions; a receptacle in which said bodies may be placed and in which the different bodies of the series occupy different locations according to their distinguishing dimension, means of causing the same bodies to occupy different locations in the receptacle according to the zone of the transportation system in which the car is at any time; and finally means by which each body in accordance with its location in the receptacle causes the amount due from each passenger to be indicated or registered. It is, of course, immaterial in what specific conditions the invention is used, that is, whether in a street car system or for any other carrier of passengers for hire, and likewise whether the system includes a large or a small number of zones; the utility and essential characteristics of the invention are the same in all cases.

In applying the principles hereinbefore explained to use in conditions where time is the variable factor, as in the previously mentioned case of a continuing entertainment, tickets of different characteristic dimensions, a holder for a supply of such tickets, receptacle to receive the tickets in different positions according to their sizes and to lapse of time, and a register operated and controlled by the tickets are employed.

Likewise, these same principles are applicable to any other use in which payment is exacted in different amounts from purchasers in proportion to a variable element. The amounts due and paid by purchaser are caused to be accurately and honestly determined and registered by requiring the purchaser and the attendant or guard to cooperate and thus to check one another in determining such amounts.

In this specification and the following claims, the term "ticket" is used in generic sense to include any piece or body, whether made of metal, wood, paper or any other material, and having any shape or form, whether circular, spherical, rectangular, or otherwise, which is adapted to be used substantially as, and for the purpose, and with the results herein described, and having a characteristic which is identified with a particular value of the variable factor controlling the determination of amounts due or payable for benefits or services.

What I claim and desire to secure by Letters Patent is:

1. A method of registering fares in a zone transportation system, which consists in providing a series of graded bodies differing from one another in a characteristic dimension, the number of such grades in the series being equal to the number of zones in the system, and each being appropriated to a separate zone, issuing to a passenger when mounting upon a vehicle of the system a body of the dimension appropriated to the zone in which the vehicle is at the time, providing a receptacle for deposit of such bodies in which there are separate resting places for the several bodies distinguished by the characteristic dimensions of the bodies, changing the dimensions of such resting places when the vehicle passes from one zone to another by amounts equal to the difference between such dimensions of successive bodies in the series, whereby each body is adapted to occupy one or another of said resting places according as the vehicle is in one or another of the zones at the time of deposit of the body in the receptacle, displacing the body from its resting place, and causing it when displaced automatically to effect registration of a value proportional to the relative position of said resting place among the other resting places.

2. A method of registering values which vary with a variable factor, which consists in providing a series of bodies, differing from one another in a characteristic dimension, in providing further, a receptacle adapted to receive said bodies and having stopping places in different positions for the bodies of respectively different dimensions, altering or adjusting the characteristic dimensions of said stopping places according to the variable factor; said adjustment causing the same body to be arrested in one or another of the stopping places according to the adjustment, displacing the body from its resting place and causing it when displaced to register a value proportional to the relative position of said resting place among other resting places.

3. A method of determining and registering values governed by a variable factor, which consists in providing a series of tickets differing from one another in a characteristic dimension and respectively appropriated to specified values of the variable factor, issuing to the purchaser a ticket of the dimension appertaining to the value of said factor existing at the time of issuance, providing a receptacle adapted to admit such tickets and having stopping places of different dimensions adapted to arrest tickets of corresponding dimensions, altering the dimensions of said stopping places with the change in the variable factor, whereby the same ticket, when placed in the receptacle is caused to occupy one or another of the several different positions dependent on the value of the factor existing at the time of deposit, causing the purchaser to deposit the ticket received by him in said receptacle at the end of his enjoyment of the benefit purchased, and causing the deposited ticket to register a value corresponding to the location of that stopping place in which it is arrested, as set forth.

4. An apparatus for registering amounts due in a system of variable values comprising a receptacle having resting places for bodies of different widths and adapted to be adjusted to cause arrest of the same body in different resting places, a register, means for displacing from said receptacle the bodies placed therein, and mechanism for actuating said register operated by a body in being so displaced.

5. An apparatus for the purpose set forth comprising a receptacle having portions of different widths adapted to arrest bodies of correspondingly different widths placed therein, means for simultaneously altering the widths of all of said portions by amounts equal to the difference, or a multiple of the difference between the widths of successive portions, whereby the same bodies placed in the receptacle under conditions of different adjustments will occupy different ones of said portions, actuators arranged adjacent to said several portions adapted to be moved by a body placed therein, a register, and gear trains of different values from the several actuators to said register for effecting registration of values conditioned upon the width of bodies respectively lodged adjacent to said several actuators.

6. An apparatus for registering fares in a zone system of transportation, comprising a series of bodies having characteristic dimensions all different from one another, a receptacle adapted to receive said bodies having resting places proportioned to fit respectively the characteristic dimensions of the different bodies and being adjustable to change the proportions of all such resting places in different conditions of such adjustment, and registering mechanism operable under control of the bodies so deposited to register values proportioned to the relative locations of the several resting places.

In testimony whereof I have affixed my signature.

GEORGE F. ROOKE.